United States Patent [19]

Hakulinen et al.

[11] Patent Number: 4,461,708

[45] Date of Patent: Jul. 24, 1984

[54] PROCEDURE FOR PURIFYING EFFLUENT WATERS, PARTICULARLY THOSE PRODUCED IN WOOD-PROCESSING INDUSTRY

[75] Inventors: Risto Hakulinen, Kiskotie; Mirja Salkinoja-Salonen, Helsinki; Jorma Räsänen; Juhani Kyytsönen, both of Savonlinna, all of Finland

[73] Assignee: Enso-Gutzeit Oy, Helsinki, Finland

[21] Appl. No.: 450,126

[22] Filed: Dec. 15, 1982

[30] Foreign Application Priority Data

Dec. 21, 1982 [FI] Finland .................................. 814095

[51] Int. Cl.³ .............................................. C02F 3/30
[52] U.S. Cl. .................................... 210/605; 210/617; 210/150
[58] Field of Search ............................... 210/615–618, 210/630, 661, 150, 151, 290, 505, 605, 778, 266

[56] References Cited

U.S. PATENT DOCUMENTS 3,238,124  3/1966  Burton ................................ 210/151
4,182,675  1/1980  Jeris ..................................... 210/618

FOREIGN PATENT DOCUMENTS 874122 10/1981 U.S.S.R. .............................. 210/505

Primary Examiner—Ivars C. Cintins
Attorney, Agent, or Firm—Toren, McGeady and Stanger

[57] ABSTRACT

The present invention concerns a procedure for purifying in a fluidized bed reactor (1) effluent waters, particularly those produced in the wood-processing industry. The reactor contains, in addition to fluidized, finely divided particles (7), also agglomerated fibre material (8) serving the purpose of reducing the quantity of the floating particles required. The fibre material may for instance be cellulose, introduced in the reactor together with the effluent water to be treated and which is converted into agglomerates in the reactor.

5 Claims, 1 Drawing Figure

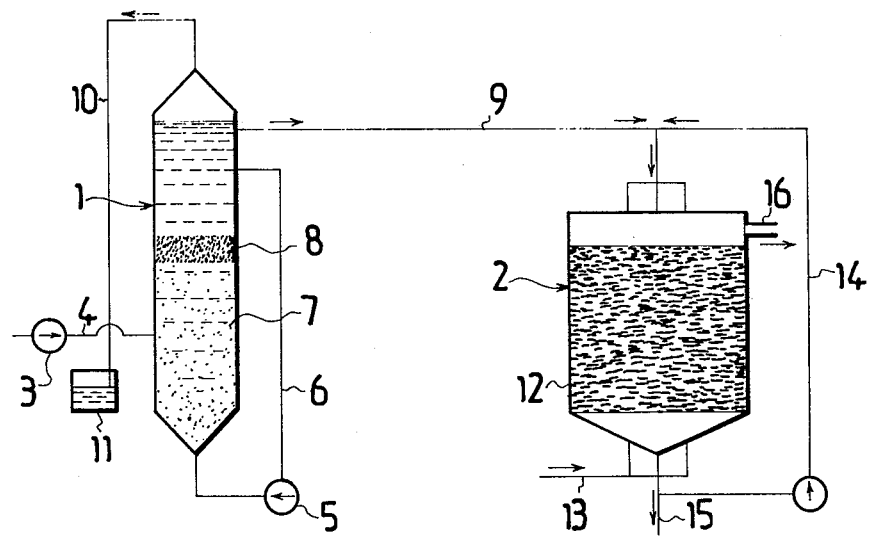

PROCEDURE FOR PURIFYING EFFLUENT WATERS, PARTICULARLY THOSE PRODUCED IN WOOD-PROCESSING INDUSTRY

The present invention concerns a procedure for purifying effluent waters, in particular those produced in the wood-processing industry, in said procedure the effluent water being treated in a fluidized bed reactor containing sand, resin particles or equivalent fine particles, which function as fixing base for bacteria decomposing the impurities in the water.

Purifying effluent waters of the wood-processing industry in a fluidized bed reactor is known for instance through the Finnish patent application No. 793914 in which is disclosed a purifying process intended above all for the treatment of bleaching effluent water from a sulphate cellulose mill, based on the use of a bactery population fixing on fluidized particles and decomposing chlorinated phenolic compounds. As the fluidized particles in this process, a plurality of different materials has been tried, but the best results have been achieved when the particles consist of anionic resin. The use of anionic resin however has the drawback that it is very costly, and owing to the large size of the reactors this becomes a remarkable cost factor.

The object of the present invention is to produce a solution to the problem, by the aid of which the number of finely divided particles floating in the reactor volume may be reduced substantially. The invention is characterized in that as fixing bed for bacteria is used in the reactor agglomerated fibre material in addition to the finely divided particles mentioned above. Without detracting from the purification result, it is possible to replace most of the floating particles normally used in reactors with fluidized beds with fibre material of this kind. It has even been found that when the quantity of agglomerate is optimal, the purification results are improved.

The procedure of the invention is particularly appropriate for the treatment of effluent waters with spent bleach in a sulphate cellulose mill, of effluent waters from barking plants, paper machines, from manufacturing mechanical pulp and of other toxic effluent waters engendered in the wood conversion industry. The quality of the bacterial population with which the reactor will be inoculated depends on the composition of the effluent water to be treated. However, the procedure may be equally applied in treating also other kinds of effluent water, for instance residential sewage.

One advantageous embodiment of the invention is characterized in that the fibre material is introduced into the reactor together with the effluent water to be purified and is turned into an agglomerate in the reactor. It has been found that the formation of agglomerates requires that the water is set into turbulence so that rectilinear flow passage of the individual fibres in the water through the reactor volume is prevented. Moreover, agglomeration is promoted by the fact that at least part of the fibres are relatively long. After the formation of agglomerates has started, the size of the agglomerates keeps continuously growing if fibres are included in the water entering the reactor. In this case, fibre material may even have to be removed from the reactor, because the excessive growth of the agglomerates first leads to an impaired result of purification and eventually to blocking of the reactor. The removal of surplus fibre from the reactor is however easy, since the fibre agglomerates arrange themselves in a separate layer above the fine particles in the reactor.

Need to eliminate extra fibre material from the reactor arises in cases when the effluent water to be treated is inherently carrying fibres. Effluent waters of this kind include several types of effluent water produced in the wood conversion impurity and loaded with cellulose fibres. On the other hand, it is possible that to the purpose of forming fibre agglomerates fibre material is added to the effluent water that is being introduced in the reactor. Such addition may then be discontinued at such time when the quantity of agglomerate formed in the reactor is sufficient.

It is advantageous to carry out the procedure of the invention as a two-step process in that the treatment in the fluidized bed reactor constitutes the first, anaerobic step and the second step of the process consists of an aerobic purification treatment in a bio-filter. In this case, the primary function of the anaerobic purification step is to decompose the toxic compounds in the effluent water, and the function of the aerobic purification step is to reduce the BOD value of the water.

The invention is described in the following in greater detail, first referring to the drawing attached, representing an apparatus intended for the application of a procedure according to the invention, and thereafter by describing the procedure with the aid of an example case.

In the drawing is depicted an apparatus which comprises a reactor 1 with a fluidized bed and a bio-filter 2 filled with bark crushings and plastic filler pieces. An anaerobic purification step takes place in the fluidized bed reactor 1, during which the oxygen content of the effluent water is in the range of 0–0.5 mg per liter and during which the toxic compounds in the water are decomposed by effect of bacterial activity, and in the bio-filter 2 is carried out an aerobic purification, the purpose of which is to lower the BOD value of the water. The effluent water to be treated is fed with a pump 3 through the feed pipe 4 into the fluidized bed reactor 1. To the fluidized bed reactor 1 is connected a circulation pipe 6 provided with a pump 5, employed to transport the water to be treated from the upper part of the reactor into its lower end. The fluidized bed 7 in the reactor volume is made up by finely divided particles, which may be e.g. of anionic resin; above them has been formed a layer 8 of agglomerated fibre material, which may for instance be cellulose. In the case depicted in the drawing, the intensity of the circulation flow through the circulation pipe 6 is so regulated that the height of the fluidized bed 7 is approximately half of the height of the reactor volume. The exit pipe 9 for the anaerobically treated water starts close to the top end of the fluidized bed reactor 1, and the gas gathering in the top part of the reactor is voided by the pipe 10 into the container 11. The water treated anaerobically is carried by the draining pipe 9 into the bio-filter 2 for the aerobic purification step. The bio-filter 2 comprises a layer 12 containing tree bark and pieces of plastic, wherein the water runs from above downward, and simultaneously air is conducted into the lower part of the filter through the pipe 13, this air producing aerobic conditions in the filter. Furthermore, the bio-filter 2 is provided with a pipe 14 for circulating the water to be treated, with a pipe 15 for extracting the purified water from the apparatus, and with a pipe 16 in order to void the air that has gone through the reactor.

EXAMPLE

Effluent water containing tall oil, derived from a tall oil production process, was treated in a fluidized bed reactor as shown in the drawing. The fluidized bed reactor had a volume of ten liters and it was filled with 1.2 liters of anionic resin particles which had been lifted up to constitute a fluidized bed filling approximately half of the reactor volume. A bacterial population was present in the reactor, fixed on the anionic resin particles and which had been obtained by laboratory treatment of a bactery-loaded sample taken from the waters in the vicinity of a cellulose mill's bleaching plant, consistent with the procedure disclosed in the Finnish patent application No. 772069. The hydraulic loading of the reactor volume was 2 m$^3$ per m$^3$ and day, and the temperature was $+25°\pm3°$ C. To begin with, the purification was so conducted that there was in the reactor, upon the floating anionic resin layer, a layer of agglomerated cellulose fibres, its volume being 2% of the reactor's capacity. Thereafter the fibre agglomerates were removed from the reactor. The BOD$_5$ and COD$_{Mn}$ values were measured in each case both from the effluent water supplied into the reactor and from that emerging from the reactor. The results of measurement are shown in the following table.

| Parameters | Agglomerates | | | Agglomerates removed | | |
|---|---|---|---|---|---|---|
| | Input | Output | Removal, % | Input | Output | Removal, % |
| BOD$_5$, mg O$_2$/l | 141.5 | 84 | 40.6 | 132 | 96 | 27.2 |
| COD$_{Mn}$, mg O$_2$/l | 107 | 65 | 39.2 | 86.5 | 62 | 28.3 |

The results show that the presence of the agglomerated cellulose fibre improved the result of purification with reference to both BOD$_5$ and COD$_{Mn}$.

It is obvious to a person skilled in the art that different embodiments of the invention are not confined to the example presented in the foregoing, and may instead vary within the scope of the claims following hereinafter.

We claim:

1. A method for purifying effluent water comprising treating the effluent water in a reactor containing a fluidized bed of finely divided particles and a bed of agglomerated fibrous material which serve as a fixing base for bacteria which decompose the impurities in the water, wherein the bed of agglomerated fibrous material constitutes a separate layer above the fluidized bed.

2. The method of claim 1 wherein the fibrous material is introduced into the reactor together with the effluent water to be purified and is turned into an agglomerate in the reactor.

3. The method of claim 2 wherein the fibrous material is added to the effluent water to be introduced in the reactor.

4. The method of claim 1 wherein the fibrous material is cellulose.

5. The method of claim 1 wherein the purification of the effluent water is carried out in a two-step process in that the treatment in the fluidized bed reactor forms the first, anaerobic step of the process, and the second step of the process consists of an aerobic purification treatment in a bio-filter.

* * * * *